(12) United States Patent
Zhang et al.

(10) Patent No.: US 9,701,794 B2
(45) Date of Patent: Jul. 11, 2017

(54) METHOD FOR PREPARING MAIN CHAIN SCISSION-TYPE POLYSILYL (METH)ACRYLATE RESIN AND APPLICATION THEREOF

(71) Applicant: SOUTH CHINA UNIVERSITY OF TECHNOLOGY, Guangzhou (CN)

(72) Inventors: Guangzhao Zhang, Guangzhou (CN); Chunfeng Ma, Guangzhou (CN)

(73) Assignee: SOUTH CHINA UNIVERSITY OF TECHNOLOGY, Guangzhou, Guangdong Province (CN)

( * ) Notice: Subject to any disclaimer, the term of this patent is extended or adjusted under 35 U.S.C. 154(b) by 0 days.

(21) Appl. No.: 14/907,437

(22) PCT Filed: Nov. 11, 2013

(86) PCT No.: PCT/CN2013/086835
§ 371 (c)(1),
(2) Date: Jan. 25, 2016

(87) PCT Pub. No.: WO2015/010390
PCT Pub. Date: Jan. 29, 2015

(65) Prior Publication Data
US 2016/0185913 A1    Jun. 30, 2016

(30) Foreign Application Priority Data
Jul. 24, 2013    (CN) .......................... 2013 1 0314516

(51) Int. Cl.
| C09D 143/04 | (2006.01) |
| C09D 167/04 | (2006.01) |
| C08G 77/14 | (2006.01) |
| C08G 65/26 | (2006.01) |
| C08F 30/08 | (2006.01) |
| C09D 5/16 | (2006.01) |
| C09D 133/10 | (2006.01) |
| C08F 230/08 | (2006.01) |
| C08G 63/08 | (2006.01) |
| C08G 63/695 | (2006.01) |
| C08G 65/16 | (2006.01) |
| C09D 171/00 | (2006.01) |

(52) U.S. Cl.
CPC .............. C08G 77/14 (2013.01); C08F 30/08 (2013.01); C08F 230/08 (2013.01); C08G 63/08 (2013.01); C08G 63/695 (2013.01); C08G 65/16 (2013.01); C08G 65/2615 (2013.01); C09D 5/16 (2013.01); C09D 5/1668 (2013.01); C09D 5/1675 (2013.01); C09D 133/10 (2013.01); C09D 143/04 (2013.01); C09D 167/04 (2013.01); C09D 171/00 (2013.01)

(58) Field of Classification Search
CPC ........ C09D 5/16; C09D 5/1637; C09D 5/165; C09D 5/1656; C09D 5/1662; C09D 5/1668; C08G 63/06; C08G 63/08; C08G 63/912; C08G 65/02; C08G 65/26; C08G 65/2615; C08F 30/08; C08F 230/08
See application file for complete search history.

(56) References Cited

U.S. PATENT DOCUMENTS

2002/0156224 A1* 10/2002 Arimura ............. C08F 293/005
528/23
2011/0123478 A1* 5/2011 Dahling ................. C09D 5/165
424/78.09

FOREIGN PATENT DOCUMENTS

| CN | 102174128 | 9/2011 |
| CN | 102432802 | 5/2012 |
| CN | 102718919 | 10/2012 |
| CN | 103044623 | 4/2013 |
| CN | 103131289 | 6/2013 |

(Continued)

OTHER PUBLICATIONS

"Graft Copolymers for Erodible Resins, from α-Hydroxyacid Oligomers, Macromonomers and Acrylic Monomers" authored by Rehel et al. and published in the Journal of Environmental Polymer Degradation (1999) 7(1), 27-34.*

(Continued)

*Primary Examiner* — Marc Zimmer
(74) *Attorney, Agent, or Firm* — Hamre, Schumann, Mueller & Larson, P.C.

(57) ABSTRACT

A method for preparing a main chain scission-type polysilyl (meth)acrylate resin and application thereof. The method comprises: a cyclic monomer, vinyl monomer and vinyl silyl ester monomer are mixed in a solvent at a formulation ratio, then added a composite initiator in a mass percentage of 0.01-5% based on the total amount of the monomers, and reacted at a temperature of 25-150° C., and under the protection of argon or nitrogen gas, so as to prepare the main chain scission-type polysilyl (meth)acrylate resin, wherein the monomers are consisted of 5-95% by mass of cyclic monomer, 0-90% by mass of vinyl monomer and 5-95% by mass of vinyl silyl ester monomer. The resulting resin can not only be hydrolyzed on the side chain silyl ester segment under the effect of the sea water, but also occur chain scission on the main chain polyester segment under the effect of the seawater, so as to solve the dependency of the traditional self-polishing material on the sailing speed, effectively control the release of the antifouling agent at a constant rate, ensure the active substance preserved on the coating surface of the ships, and properly meet the antifouling requirements on the low sailing speed ships, submarines and off-shore oil platform facilities.

7 Claims, 2 Drawing Sheets

(56) References Cited

FOREIGN PATENT DOCUMENTS

| CN | 103173085 | | 6/2013 |
|---|---|---|---|
| WO | WO 2011/132537 | * | 10/2011 |
| WO | 2013/052276 | | 4/2013 |

OTHER PUBLICATIONS

International Search Report of PCT/CN2031/086835, dated Apr. 30, 2014, and English language translation thereof, 6 pages total.

* cited by examiner

METHOD FOR PREPARING MAIN CHAIN SCISSION-TYPE POLYSILYL (METH)ACRYLATE RESIN AND APPLICATION THEREOF

TECHNICAL FIELD

The present invention relates to a silyl ester resin, particularly to a method for preparing a main chain scission-type polysilyl (meth)acrylate resin and application thereof; the application is mainly in the technical field of marine antifouling materials.

BACKGROUND ART

Marine bio-fouling refers to a bio-fouling formed by the attachment and growth of the marine microorganisms, plants and animals on the surface of the ships and the off-shore facilities, which has caused hazard to the marine transportation and the exploration, development and utilization of the marine resources. In the national defense field, the marine bio-fouling has also been a great problem for a long time, for example, the marine bio-fouling can accelerate the corrosion of the steel plate at the bottom of the warship, and reduce the service life of the weapon equipment, and at the same time, the damage caused by corrosion requires a lot of manpower to make a frequent periodic maintenance, which seriously affects the Navy's fighting capacity and results in huge economic losses. In addition, the marine bio-fouling may increase the weight of the warship and sailing resistance, increase the fuel consumption, and seriously affect the warship's combat performance. Especially for the warship or submarine, which has stayed in a harsh ocean environment for a long time, the bottom of the ship is severely damaged by the marine bio-fouling. The antifouling coating is the most commonly used method at present for solving the marine bio-fouling problem in the warship. However, as compared to the common civil ship, the navy warship has the features, such as longer berthing time, lower sailing frequency, higher cross-sea mobility, etc. The self-polishing technologies in the prior art are mainly designed for the ocean-going ship, and the performances have certain requirements on both the sailing duration and the sailing speed. In the static stage, it is hard to achieve the desired self-polishing effect by the self-flowing effect of the seawater alone. In fact, how to make a long-lasting antifouling under the static state has always been a worldwide problem, which has an important strategic significance for warships, submarines and off-shore oil platforms.

SUMMARY OF THE INVENTION

An object of the present invention is directed to the deficiencies in the prior materials and techniques, so as to provide a main chain scission-type polysilyl (meth)acrylate resin with the main chain containing a polyester segment and the side chain containing a silyl ester segment, and a method for preparing the same.

Another object of the present invention is to provide a use of a main chain scission-type polysilyl (meth)acrylate resin, which can achieve a static antifouling effect, in preparing a marine antifouling coating.

The main chain scission-type polysilyl (meth)acrylate resin provided in the present invention is formed by copolymerizing a cyclic monomer, vinyl monomer, vinyl silyl ester monomer in the presence of a composite initiator, with a structure of a random copolymer consisting of a polyester segment and a vinyl silyl ester segment. The present invention relates to a material made by introducing a main chain polyester segment into a traditional self-polishing resin, which can not only be hydrolyzed on the side chain silyl ester segment under the effect of the seawater, but also occur chain scission on the main chain polyester segment under the effect of the seawater, so as to meet the requirements in the static antifouling application. The main chain scission-type polysilyl (meth)acrylate resin of the present invention comprises a main chain scission-type polysilyl acrylate resin and a main chain scission-type polysilyl methacrylate resin.

The objects of the present invention are achieved by the following technical solutions:

a method for preparing a main chain scission-type polysilyl (meth)acrylate resin, comprises: a cyclic monomer, vinyl monomer, and vinyl silyl ester monomer are mixed in a solvent at a formulation ratio, then added a composite initiator in a mass percentage of 0.01 to 5% based on the total amount of the monomers, and reacted at a temperature of 25 to 150° C., and under the protection of argon or nitrogen gas, so as to prepare the main chain scission-type polysilyl (meth)acrylate resin; wherein the monomers are consisted of 5 to 95% by mass of cyclic monomer, 0 to 90% by mass of vinyl monomer, and 5 to 95% by mass of vinyl silyl ester monomer; the solvent is one or more of tetrahydrofuran, dimethyl formamide, dimethyl acetamide, butyl acetate, toluene, xylene, acetone and n-butanol;

the cyclic monomer is one or more of lactide, glycolide, caprolactone, 2-methyl-ε-caprolactone, 2-chloro-ε-caprolactone, butyrolactone, valerolactone, 2-methylene-1,3-dioxepane, ethylene carbonate, propylene carbonate, tri-methylene cyclic carbonate, 2,2-dimethyl trimethylene cyclic carbonate, dimethylaminotrimethylene cyclic carbonate, 2-ethyl-2-oxazoline, 2-methyl-2-oxazoline, five-membered ring phosphate, six-membered ring phosphate, epoxy ethane, epoxy propane, epoxy chloropropane and γ-glycidyloxypropyltrimethoxy silane;

the vinyl monomer is one or more of acrylic acid, methacrylic acid, methyl methacrylate, ethyl methacrylate, butyl methacrylate, octyl methacrylate, methyl acrylate, ethyl acrylate, butyl acrylate, octyl acrylate, dodecafluoroheptyl methacrylate, acrylamide, methacrylamide, methylol acrylamide, isopropyl acrylamide, ethylene glycol methacrylate, hydroxyethyl acrylate, hydroxyethyl methacrylate, glycidyl methacrylate, styrene, dimethylaminoethyl methacrylate, diethylaminoethyl methacrylate, vinylpyrrolidone, tetravinylpyridine, acryloyloxyethyldimethylbenzyl ammonium chloride, methacryloyloxyethylbenzyldimethyl ammonium chloride, methacryloyloxyethyltrimethyl ammonium chloride, polysulfobetainemethyl methacrylate and polycarboxybetainemethyl methacrylate;

the vinyl silyl ester monomer is one or a mixture in any ratio of two or more of trimethylsilyl acrylate, triethylsilyl acrylate, isopropylsilyl acrylate, triphenylsilyl acrylate, tributylsilyl acrylate, tri-n-octylsilyl acrylate, trimethylsilyl methacrylate, triethylsilyl methacrylate, triisopropylsilyl methacrylate, triphenylsilyl methacrylate, tributylsilyl methacrylate, and tri-n-octylsilyl methacrylate, the composite initiator is a mixture of two or more of low molecular weight alcohol, low molecular weight amine, thiol, phosphazene, phosphazene salt, phosphazene oxide, azobisisobutyronitrile, and benzoyl peroxide.

Preferably, the mass ratio between the total amount of the monomers and the solvent is (50~200): 100. The low molecular weight amine is at least one of aliphatic amines containing 2~10 carbon atoms. The low molecular weight alcohol is at least one of aliphatic alcohols containing 2~10 carbon atoms.

A main chain scission-type polysilyl (meth)acrylate resin, is prepared by a method described above.

Use of the main chain scission-type polysilyl (meth) acrylate resin in preparing a marine antifouling coating, comprises: 10 to 60 parts by weight of the main chain scission-type polysilyl (meth)acrylate resin, 20 to 60 parts by weight of cuprous oxide, 3 to 15 parts by weight of organic antifouling agent, 10 to 40 parts by weight of pigment filler, 0 to 5 parts by weight of auxiliary agent and 5 to 20 parts by weight of organic solvent are mixed and stirred to uniform, so as to produce a marine antifouling coating;

wherein the organic-fouling agent is one or more of copper pyrithione, zinc pyrithione, pyridyltriphenyl borane, 4,5-dichloro-2-n-octyl-4-isothiazolinyl-3-one, medetomidine, 2-(p-chlorophenyl)-3-cyano-4-bromo-5-trifluoromethyl-pyrrole, and 2,4,6-trichlorophenyl-N-phenyl maleimide;

the pigment filler is one or more of zinc oxide, red iron oxide, calcium carbonate and barium sulfate;

the auxiliary agent is one or more of chlorinated paraffin, rosin, dioctyl phthalate, castor oil, bentonite, polyamide wax and fumed silica;

the organic solvent is one or more of xylene, n-butanol, methyl isobutyl ketone, butanone, diacetone alcohol and vinyl acetate.

Compared to the prior art, the present invention has the following advantages and beneficial effects:

(1) in the present invention, a main chain scission-type self-polishing resin material with the main chain containing a polyester segment and the side chain containing a silyl ester segment is prepared by the copolymerization reaction between a cyclic monomer and a vinyl silyl ester monomer. The resulting resin can not only be hydrolyzed on the side chain silyl ester segment under the effect of the seawater, but also occur chain scission on the main chain polyester segment under the effect of the seawater, so as to solve the dependency of the traditional self-polishing material on the sailing speed, and regenerate a new surface in the static seawater by hydrolysis, thus effectively controlling the release of the antifouling agent at a constant rate, ensuring the active substance preserved on the coating surface of the ship, and properly meeting the antifouling requirements on the low sailing speed ships, marines and off-shore oil platform facilities;

(2) due to both the main chain and the side chain being capable of hydrolysis in the seawater, the material of the present invention can be hydrolyzed and polished uniformly and completely, so as to make the coating surface of the ship smoothing during sailing, thus reducing the surface roughness, reducing the sailing resistance, and enduing the material with an excellent drag reduction performance;

(3) in the present invention, a vinyl monomer can also be added during the copolymerization to regulate the mechanical properties and adhesion of the material, and improve the solubility of the material in the conventional solvent of the ship coating, so that the material has excellent mechanical properties and adhesion;

(4) the resin of the present invention has a good solubility in the conventional solvent of the ship coating, and has a simple synthesis process and low cost, so that it is suitable for a commercial production, and the material has found a promising application in the field for preparing a marine antifouling coating.

DETAILED DESCRIPTION

In order to better understand the present invention, the present invention is further described in detail below in combination with the examples, but the embodiments of the present invention are not limited thereto.

Example 1

Figure 1:
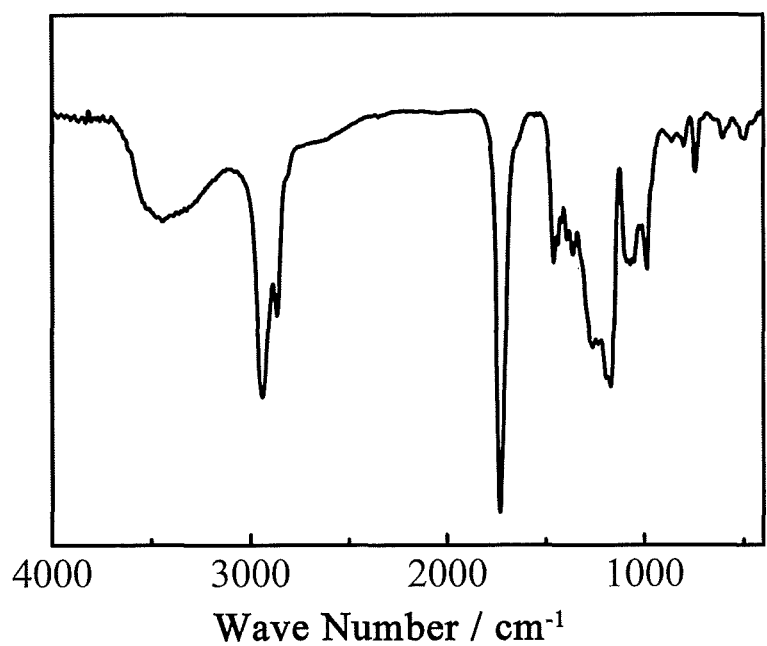
FIG. 1 shows an infrared spectrum of the poly(caprolactone-trimethylsilyl methacrylate) obtained in example 1.
Figure 2:
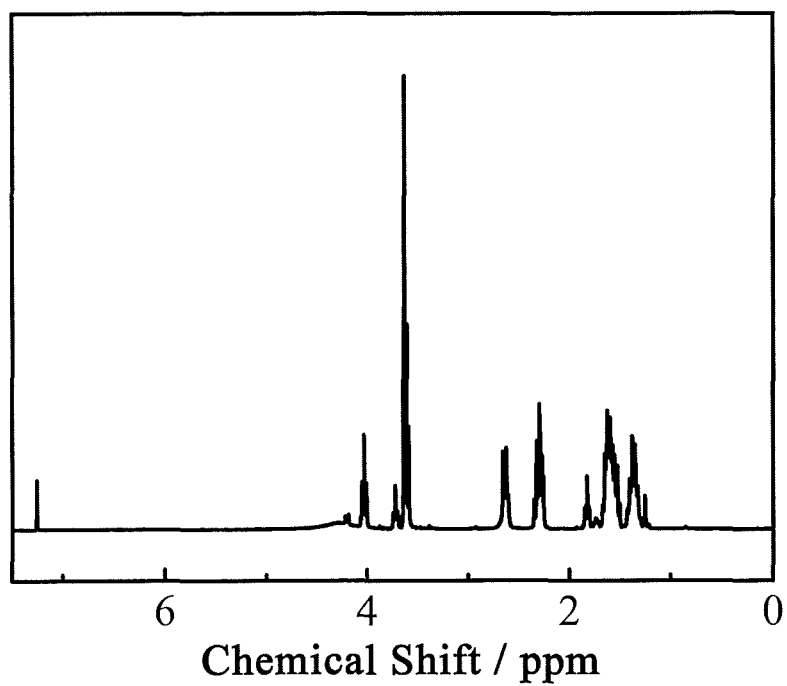
FIG. 2 shows a nuclear magnetic spectrum of the poly (caprolactone-trimethylsilyl methacrylate) obtained in example 1.

50 g of caprolactone, 50 g of trimethylsily methacrylate, 0.1 g of methanol and 100 ml of xylene were added in a 250 ml dried three-neck flask equipped with a stirrer and a thermometer, added 100 μl of phosphazene (t-BuP$_4$) solution in n-hexane, reacted at 25° C. for 6 h, then precipitated in methanol, and dried under vacuum, so as to obtain a poly (caprolactone-trimethylsilyl methacrylate), with a yield of 90%. As shown in the infrared spectrum in FIG. 1, the occurrence of 1730 cm$^{-1}$ (an absorption peak corresponding to ester group of the caprolactone), 2860 cm$^{-1}$ (an absorption peak corresponding to CH$_2$ of the caprolactone) and 2950 cm$^{-1}$ (an absorption peak corresponding to CH$_3$ of the silyl ester), indicated that the target product was successful synthesized. As shown in the nuclear magnetic spectrum in FIG. 2, the occurrence of the chemical shift δ=0.87 (an absorption peak corresponding to CH$_3$ in the silyl ester) and the four peaks at δ=1.32-1.45 ppm, 1.55-1.72 ppm, 2.25-2.40 ppm, and 3.98-4.17 ppm (absorption peaks corresponding to CH$_2$ of the caprolactone), further indicated that the poly(caprolactone-trimethylsilyl methacrylate) was synthesized.

Figure 3:
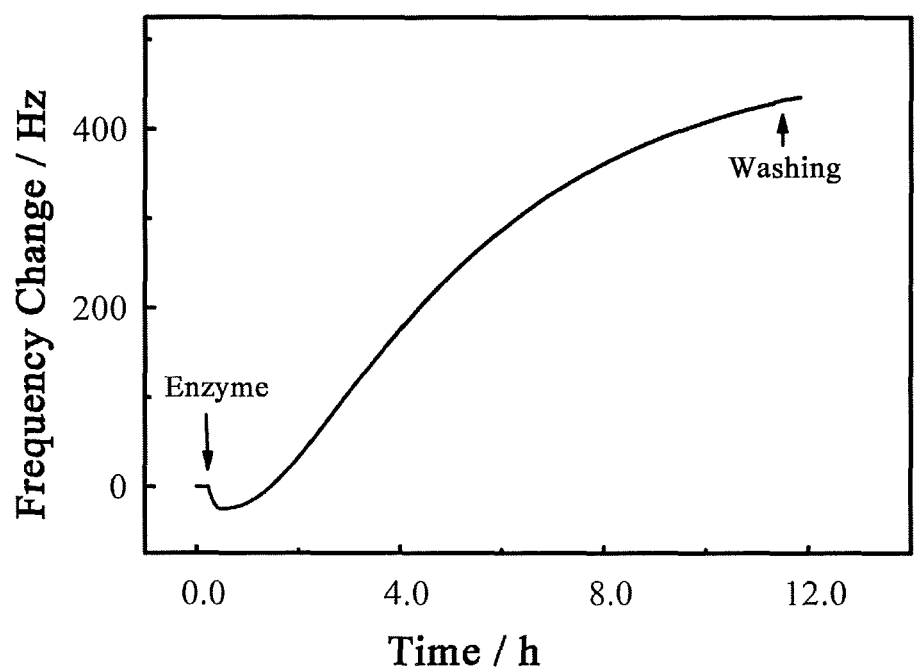
FIG. 3 shows a degradation profile of the poly(caprolactone-trimethylsilyl methacrylate) obtained in example 1.

The product obtained in example 1 had a number average molecular weight of 2.0×10$^4$ g/mol as determined by gel permeation chromatograph. Due to the main chain containing a polyester segment, the product obtained in example 1 can be degraded under the action of enzyme. The main chain scission of the polymer was characterized by a quartz crystal microbalance. As shown in FIG. 3, the mass loss of the material can be determined in situ by a quartz crystal microbalance, and the frequency change was corresponded to the mass change and was in inverse proportion. As shown, when the material was added in the enzyme solution, the frequency was increased, indicating that there was a mass loss. As the silyl ester segment in the material can not be hydrolyzed under the action of the enzyme, the mass loss was contributed by the main chain scission. Therefore, this material was demonstrated to be a main chain scission type.

30 g of the synthesized poly (caprolactone-trimethylsilyl methacrylate), 40 g of cuprous oxide, 5 g of copper pyrithione, 10 g of zinc oxide and 15 g of xylene were mixed under stirring so as to prepare a marine antifouling coating. 200 g of the prepared coating was sprayed on an epoxy resin panel to form a film, and the shallow submergence tests were made in the Xiamen sea (April, 2012-April, 2013) according to GB/T5370-2007 "Method for testing antifouling panels in shallow submergence", and the result that there were no marine organisms grown within 12 months, indicted that the antifouling coating prepared from the material had a good antifouling effect and had no dependency on the sailing speed.

Example 2

10 g of lactide, 90 g of triisopropylsilyl acrylate, 0.01 g of diethylene glycol, and 100 ml of tetrahydrofuran were added in a 250 ml sealing tube, frozen in liquid nitrogen, and replaced with nitrogen gas for three times, then added 70 µL of t-BuP4 solution in n-hexane under a nitrogen atmosphere, sealed the tube in molten state, and reacted at 60° C. for 2 h, then precipitated in 100 mL of methanol, and dried under vacuum for 12 h, so as to obtain a polymer with a number average molecular weight of $1.5 \times 10^4$ g/mol as determined by gel permeation chromatography and a yield of 94%. 20 g of the polymer was mixed with 120 g of cuprous oxide, 20 g of pyridyltriphenyl borane, 10 g of red iron oxide and 30 g of methyl isobutyl ketone under stirring, so as to prepare a marine antifouling coating. The marine antifouling coating was brushed on an epoxy resin panel to form a film, and the shallow submergence tests made in the Xiamen sea (April, 2012-February, 2013) showed that there were no marine organisms grown within 10 months.

Example 3

180 g of ethylene carbonate, 10 g tri-n-butylsilyl acrylate, 10 g of methyl methacrylate, and 0.02 g of methanol were added in a 500 mL three-neck flask, frozen in liquid nitrogen, replaced with nitrogen gas for three times, then added 70 µL of t-BuP4 solution in n-hexane rapidly under nitrogen atmosphere, and reacted at 150° C. for 12 h. After the reaction was completed, the obtained material was precipitated in methanol, filtrated, and dried under vacuum, so as to obtain a polymer with a number average molecular weight of $2.4 \times 10^4$ g/mol as determined by gel permeation chromatography and a yield of 90%. 30 g of the polymer was mixed with 40 g of cuprous oxide, 7 g of 4,5-dichloro-2-n-octyl-4-isothiazolinyl-3-one, 7 g of zinc oxide, 6 g of calcium carbonate, 3 g of bentonite, and 7 g of butanone under stirring so as to prepare a marine antifouling coating. The marine antifouling coating was brushed on an epoxy resin panel to form a film, and the shallow submergence tests made in the Xiamen sea (April, 2012-April, 2013) showed that there were no marine organisms grown within 12 months.

Example 4

80 g of 2-methylene-1,3-dioxepane, 20 g of methyl methacrylate, 20 g of tri-n-butyl silyl acrylate, 0.5 g of azobisisobutyronitrile and 100 mL of toluene solution were added in a 250 mL three-neck flask, and reacted at 50° C. for 12 h. After the reaction was completed, the obtained material was precipitated with n-hexane, filtrated, and dried under vacuum for 12 h so as to obtain a polymer with a number average molecular weight of $1.3 \times 10^4$ g/mol as determined by gel permeation chromatograph and a yield of 90%. 60 g of the polymer was mixed with 20 g of cuprous oxide, 3 g of medetomidine, 12 g of zinc oxide, and 5 g of xylene under stirring so as to prepare a marine antifouling coating. The marine antifouling coating was brushed on an epoxy resin panel to form a film, and the shallow submergence tests made in the Xiamen sea (April, 2012-April, 2013) showed that there were no marine organisms grown within 12 months.

Example 5

50 g of 2-methyl-ε-caprolactone, 25 g of methyl methacrylate, 25 g of triisopropylsilyl methacrylate, 0.1 g of benzoyl peroxide and 100 ml of xylene solution were added in a 100 mL three-neck flask, and reacted at 70° C. for 24 h. After the reaction was completed, the obtained material was precipitated with water, filtrated, and dried under vacuum for 12 h, so as to obtain a polymer with a number average molecular weight of $2.3 \times 10^4$ g/mol as determined by gel permeation chromatograph and a yield of 80%. 10 g of the polymer was mixed with 30 g of cuprous oxide, 5 g of 2,4,6-trichlorophenyl-N-phenyl maleimide, 30 g of zinc oxide, 5 g of red iron oxide, 5 g of polyamide wax and 15 g of xylene under stirring so as to prepare a marine antifouling coating. The marine antifouling coating was sprayed on an epoxy resin panel to form a film, and the shallow submergence tests made in the Xiamen sea (April, 2012-June, 2013) showed that there were no marine organisms grown within 14 months.

Example 6

40 g of 2-chloro-ε-caprolactone, 60 g of trimethylsilyl methacrylate, 0.1 g of ethanol and 100 mL of toluene solution were added in a 250 mL three-neck flask, frozen in liquid nitrogen, and replaced with nitrogen gas for three times, then added 7 µL of t-BuP4 solution in n-hexane under a nitrogen atmosphere, reacted at 25° C. for 12 h, precipitated in methanol, filtrated, and dried under vacuum, so as to obtain a polymer with a number average molecular weight of $5.5 \times 10^4$ g/mol as determined by gel permeation chromatograph and a yield of 90%. 30 g of the polymer was mixed with 30 g of cuprous oxide, 10 g of zinc pyrithione, 7 g of barium sulfate, 3 g of bentonite, and 20 g of n-butanol under stirring so as to prepare a marine antifouling coating. The marine antifouling coating was brushed on an epoxy resin panel to form a film, and the shallow submergence tests made in the Xiamen sea (April, 2012-April, 2013) showed that there were no marine organisms grown within 12 months.

The above-described examples are the preferred embodiments of the present invention, but embodiments of the present invention are not limited thereto, any other changes, modifications, substitutions, combinations, and simplifications made without departing from the spirit and principles of the present invention, which are all the equivalent replacements, should be encompassed within the scope of the present invention.

The invention claimed is:

1. A method for preparing a main chain scission-type polysilyl (meth)acrylate resin, comprising:
    mixing monomers including a cyclic monomer, a vinyl monomer, and a vinyl silyl ester monomer in a solvent at a formulation ratio; and
    adding to the solvent a composite initiator in a mass percentage of 0.01 to 5% based on the total amount of the monomers, and reacting at a temperature of 25 to 150° C. under the protection of argon or nitrogen gas to prepare the main chain scission-type polysilyl (meth) acrylate resin,
    wherein the monomers include 5 to 95% by mass of cyclic monomer, 0 to 90% by mass of vinyl monomer, and 5-95% by mass of vinyl silyl ester monomer;
    the solvent is one or more of tetrahydrofuran, dimethyl formamide, dimethyl acetamide, butyl acetate, toluene, xylene, acetone, and n-butanol;

the cyclic monomer is one or more of lactide, glycolide, caprolactone, 2-methyl-ε-caprolactone, 2-chloro-ε-caprolactone, butyrolactone, valerolactone, 2-methylene-1,3-dioxepane, ethylene carbonate, propylene carbonate, tri-methylene cyclic carbonate, 2,2-dimethyl trimethylene cyclic carbonate, dimethylaminotrimethylene cyclic carbonate, 2-ethyl-2-oxazoline, 2-methyl-2-oxazoline, five-membered ring phosphate, six-membered ring phosphate, epoxy ethane, epoxy propane, epoxy chloropropane, and γ-glycidyloxypropyltrimethoxy silane;

the vinyl monomer is one or more of acrylic acid, methacrylic acid, methyl methacrylate, ethyl methacrylate, butyl methacrylate, octyl methacrylate, methyl acrylate, ethyl acrylate, butyl acrylate, octyl acrylate, dodecafluoroheptyl methacrylate, acrylamide, methacrylamide, methylol acrylamide, isopropyl acrylamide, ethylene glycol methacrylate, hydroxyethyl acrylate, hydroxyethyl methacrylate, glycidyl methacrylate, styrene, dimethylaminoethyl methacrylate, diethylaminoethyl methacrylate, vinylpyrrolidone, tetravinylpyridine, acryloyloxyethyldimethylbenzyl ammonium chloride, methacryloyloxyethylbenzyldimethyl ammonium chloride, methacryloyloxyethyltrimethyl ammonium chloride, polysulfobetainemethyl methacrylate, and polycarboxybetainemethyl methacrylate;

the vinyl silyl ester monomer is one or a mixture in any ratio of two or more of trimethylsilyl acrylate, triethylsilyl acrylate, isopropylsilyl acrylate, triphenylsilyl acrylate, tributyl silyl acrylate, tri-n-octylsilyl acrylate, trimethylsilyl methacrylate, triethylsilyl methacrylate, triisopropylsilyl methacrylate, triphenylsilyl methacrylate, tributylsilyl methacrylate, and tri-n-octylsilyl methacrylate; and the composite initiator includes one or more of phosphazene, phosphazene salt, phosphazene oxide, azobisisobutyronitrile and benzoyl peroxide.

2. The method for preparing a main chain scission-type polysilyl (meth)acrylate resin according to claim 1, wherein a mass ratio between the total amount of monomers and the solvent is (50~200):100.

3. The method for preparing a main chain scission-type polysilyl (meth)acrylate resin according to claim 1, wherein the composite initiator further includes a low molecular weight amine that is at least one of aliphatic amines containing 2~10 carbon atoms.

4. The method for preparing a main chain scission-type polysilyl (meth)acrylate resin according to claim 1, wherein the composite initiator further includes a low molecular weight alcohol that is at least one of aliphatic alcohols containing 2~10 carbon atoms.

5. A main chain scission-type polysilyl (meth)acrylate resin, prepared by the method according to claim 1.

6. A method of preparing a marine anti-fouling coating containing the main chain scission-type polysilyl (meth)acrylate resin of claim 5 comprising:

mixing and stirring 10 to 60 parts by weight of the main chain scission-type polysilyl (meth)acrylate resin, 20 to 60 parts by weight of cuprous oxide, 3 to 15 parts by weight of organic antifouling agent, 10 to 40 parts by weight of pigment filler, 0 to 5 parts by weight of auxiliary agent, and 5 to 20 parts by weight of organic solvent, so as to produce a marine antifouling coating, wherein the organic fouling agent is one or more of copper pyrithione, zinc pyrithione, pyridyltriphenyl borane, 4,5-dichloro-2-n-octyl-4-isothiazolinyl-3-one, medetomidine, 2-(p-chlorophenyl)-3-cyano-4-bromo-5-trifluoromethyl-pyrrole, and 2,4,6-trichlorophenyl-N-phenyl maleimide;

the pigment filler is one or more of zinc oxide, red iron oxide, calcium carbonate, and barium sulfate;

the auxiliary agent is one or more of chlorinated paraffin, rosin, dioctyl phthalate, castor oil, bentonite, polyamide wax, and fumed silica; and the organic solvent is one or more of xylene, n-butanol, methyl isobutyl ketone, butanone, diacetone alcohol, and vinyl acetate.

7. The method for preparing a main chain scission-type polysilyl (meth)acrylate resin according to claim 1, wherein the composite initiator further includes one or more of low molecular weight alcohol, low molecular weight amine, and thiol.

\* \* \* \* \*